(No Model.)
O. GASSETT.
ELECTRIC BLOCK SIGNALING APPARATUS.
No. 251,867. Patented Jan. 3, 1882.
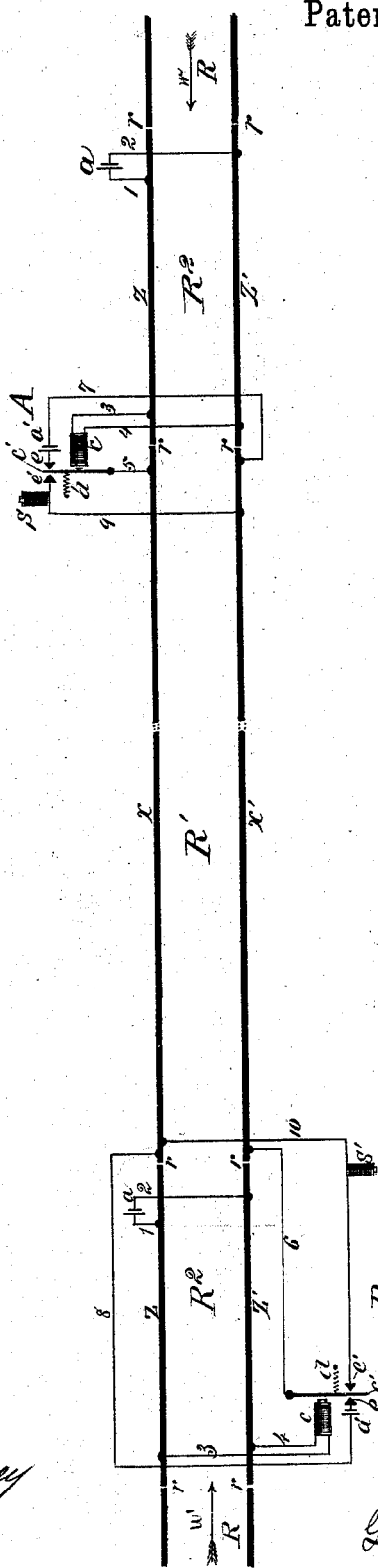
Witnesses
R. H. Whittlesey
C. L. Parker
Inventor
Oscar Gassett
By Attorney
George H. Christy

UNITED STATES PATENT OFFICE.

OSCAR GASSETT, OF BOSTON, MASSACHUSETTS, ASSIGNOR TO THE UNION SWITCH AND SIGNAL COMPANY, OF PITTSBURG, PENNSYLVANIA.

ELECTRIC BLOCK SIGNALING APPARATUS.

SPECIFICATION forming part of Letters Patent No. 251,867, dated January 3, 1882.

Application filed October 22, 1881. (No model.)

*To all whom it may concern:*

Be it known that I, OSCAR GASSETT, of Boston, Suffolk county, State of Massachusetts, temporarily residing at Sewickley, county of Allegheny, State of Pennsylvania, have invented or discovered a new and useful Improvement in Electric Block Signaling Apparatus; and I do hereby declare the following to be a full, clear, concise, and exact description thereof, reference being had to the accompanying drawings, making a part of this specification, in which like letters indicate like parts.

My present apparatus is chiefly designed for use on or in connection with a single-track railway, but may in some or all of its features be applied to one or both lines of a double track. I will describe it, however, as applied to a single track, and in this use of it it is so organized as to give and reverse signals in like order and of like signification and to give like protection to trains in whichever direction they may be running. Such a track is represented at R R. The entire track to be protected is divided into blocks of any desired length—say one mile, more or less—and a block-station or a set of the blocking apparatus is put up or arranged at or near the end of each such block-section.

In the drawings, R' indicates a block-section intermediate between the block-stations, of which two are represented in the drawings A and B. The rails of the block-sections R' are to be supplied with the usual or any desired electric connections from rail to rail, and immediately outside the outer ends of each block-section R' are two short circuit-closing sections, R², and each of the track-sections thus mentioned is insulated from the next abutting section by the usual or any desired insulating devices inserted at r. Each circuit-closing section R² has one of its rails or line of rails, $z$, connected from at or near one end by wire 1 with one pole of a battery, $a$, and from at or near its outer end by wire 3 with one end of the coil of an electro-magnet, $c$. Like wires, 2 and 4, similarly arranged, connect the opposite rail or line of rails, $z'$, with the opposite pole of the battery $a$ and wire of the coil $c$. Hence normally on each section R², I have a closed circuit, the rails of each line $z$ $z'$ being electrically connected for that purpose.

The armature $c'$ of the electro-magnet $c$ at station A is connected electrically by wire 5 with the line of rails $x$ of section R' and at or near the end of the section, and the like armature at station B is suitably connected by wire 6 with the adjacent end of the other line of rails, $x'$, of the same section. Each armature $c'$ plays between two contact-points, $e$ $e'$, so that when its electro-magnet $c$ is charged or excited it will make electrical contact with $e$ and at other times with $e'$, a spring, $d$, securing the latter result. At station A the contact point or stud $e$ communicates through a battery, $a'$, by wire 7, with the adjacent end of line or rails $x'$ of section R', and at station B like connection is made from $e$, through a like battery, $a'$, and by wire 8, with the adjacent end of the line of rails $x$ of section R'. Also, at station A a wire, 9, leads from the line of rails $x'$ to one end of the coil of an electro-magnet, $s$, and the other end of the coil goes to contact point or stud $e'$. At station B a like wire, 10, leads from line of rails $x$, through electro-magnets $s'$, to contact point or stud $e'$. Hence it will be seen that, considering the block-section R' as a parallelogram, the signal-magnets $s$ $s'$ are electrically connected to the rail-lines constituting the sides of the parallelogram at or near two diagonally-opposite corners thereof and that the two armature-connections are made at or near the other two diagonally-opposite corners thereof, and as a matter of convenience I define these connections as being in reverse order to each other; but the battery-connections by wires 7 and 8 are in the same order as the signaling-magnet connections—that is to say, they are at each end of the section each connected with the same rail as in the corresponding signaling-magnet.

The electro-magnets $s$ $s'$, I term "signal-operating magnets." They are designed and are to be arranged to actuate the signals in any suitable way, many such being known in the art, and hence I deem it unnecessary to describe or even show the signals or the mechanism intermediate between them and their electro-magnets $s$ $s'$.

It will now be readily seen that normally or in the absence of all trains and with the apparatus properly constructed circuits through the track-sections $R^2$ will be closed, so that the armatures $c'$ will each be drawn away from their respective contacts $e'$, and the signal-magnets $s\ s'$, not being in any closed circuit or circuits, will be free from magnetic action, and the signals actuated thereby will be free, or, say, at "danger." Assuming, now, that a train approaches station A from the right, as indicated by arrow $w$, as soon as connection is made across between rails $z\ z'$ by wheels and axle the track-circuit will be "short-circuited," as it is called, so as to cut out the battery $a$. This will demagnetize the electro-magnet $c$ at station A and allow the spring $d$ to draw the armature $c'$ over to contact-point $e'$. This will result in the closing of a circuit from armature $c'$ of station A through wire 5, line of rails $x$, wire 8 at station B, battery $a'$, contact $e$, armature $c'$, and wire 6, all at station B, back by line of rails $x'$ to and through wire 9 of station A, to and through the electro-magnet $s$ and back to contact $e'$. Thus the signaling electro-magnet $s$ will be charged or excited, so as to change the signal at station A to "safety." This is done in the face of the engineer, so that he may know thereby that the track is clear and unbroken to station B, for a train ahead on section $R'$ would short-circuit the circuit last described or a broken rail or misplaced switch would break such circuit, so that no battery action could excite the signaling-magnet $s$, and hence the signal at A would continue to indicate "danger" or be unchanged. But everything being all right the train proceeds, and on entering the section $R'$ the wheels and axle make a connection across between lines of rails $x$ and $x'$, so as to short-circuit the circuit last described and by doing so cut out the signaling-magnet $s$ from the influence of the battery $a'$ at station B, and it being thus demagnetized lets the signal at A go back to its "danger" or normal position, and thereby protect the rear of the train so long as it or any part of it may be on the section $R'$, as against a following train; but as soon as the forward train passes off the section $R'$ the train following may proceed under the action and protection of the signal at A, as above described. Assuming, now, (the track being clear,) that a train approaches station B from the left, as indicated by arrow $w'$, in like manner as before, on entering section $R^2$ at station B it short-circuits or cuts out the battery $a$ at that station, so as to demagnetize the electro-magnet $c$ and let the armature $c'$ go to the contact stud or point $e'$, (all at station B,) as a result of which a new circuit will be formed from $c'$, station B, by wire 6, line of tracks $x'$, to station A, through wire 7, battery $a'$, contact $e$, armature $c'$, wire 5, (all at station A,) and thence back by line of rails $x$ to station B and by wire 10 through signaling-magnet $s'$ to contact $e'$. The signaling-magnet $s'$, being thus brought into circuit, will act to shift the corresponding signal at station B from "danger" to "safety," in the face of the engineer, so that he may know that he has a clear unbroken track to station A. As he passes onto section $R'$ the circuit last described will be short-circuited in like manner as above described with reference to the train first supposed, so that the signal at station B will go to "danger," for the protection of the train, so long as it remains on section $R'$, as against a following train. Assuming, in the third place, that while a train is on section $R'$, between stations A and B, and going in either direction, a train approaches the block-station forward from the opposite direction. As soon as such approaching train enters track-section $R^2$ the result above described will follow, except that the signal $s$ or $s'$, as the case may be, will remain at "danger," and will not by shifting to "safety" in the face of the engineer indicate to him that the block is clear. This results from the fact that each signaling-magnet is actuated only by a battery at the next block-station—that is to say, the signal $s$ at station A by the battery $a'$ at station B and the signal $s'$ at station B by the battery $a$ at station A. Hence so long as the lines of track $x\ x'$ of section $R'$ are electrically connected by the wheels and axle of a train or a part of a train thereon, no matter which way such train or part of a train may be moving, the signaling-magnet cannot at either station be so actuated as to give the signal "line clear." Hence tail collisions and face collisions are equally well guarded against.

It is preferable, but not essential, that the signals actuated by the magnets $s\ s'$ be put up on opposite sides of the track, since the running of trains one way is governed by one set of signals—those actuated by the magnets $s$—and trains going the other way are governed by the other set of signals—those actuated by the magnets $s'$; and it will be understood that in putting up the present system of apparatus if the entire track is to be protected, or any part of it in excess of the length of a block-section, the apparatus of station A will be duplicated on a short circuit closing section of insulated track to the left of B, and the apparatus here shown at station B will be duplicated on a similar short section of track to the right of A, and so on between the ends of block-sections.

The rail-circuits $z\ z'$, in connection each with its battery $a$ and electro-magnet $c$ and with wheels and axles as described, constitute merely an electrical make-and-break mechanism, and as regards this part of the apparatus other suitable make-and-break mechanisms adapted to be actuated by the passing of a train may be substituted therefor; and while, as the preferable plan, I have described the signals as normally at "danger," I do not limit myself to a construction or arrangement of apparatus necessarily involving such feature.

The signals may be normally at "safety," if so preferred, and the successive motions follow therefrom in order, but as I believe less advantageously. Additional signals may be added at pleasure and worked by additional circuits, or by relays or otherwise, as may be preferred. It should also be noted that as a train going, say, from A leaves the apparatus at B, it leaves the signal at $s'$ in its normal position, so that it is ready for the approach of a train going the other way, and the latter after passing A leaves the signal at $s$ also in its normal position for a train going in the direction of the arrow $w$.

Instead of extending the armature $c'$ to form a moving contact-piece, a separate arm or any suitable form of movable contact taking its motion directly or indirectly from the armature may be employed, or, in other words, the armature $c'$ may be made in two parts and suitably connected, so as, by a modified construction, to perform substantially the same function in substantially the same way, and as regards such function such device or mechanism may perhaps be best designated as a "circuit-changer" or "circuit-shifting" apparatus or mechanism, and all such modifications in this or other features of the apparatus are hereby included within the scope of the present invention.

It will also be within my invention to arrange the signals farther back, so that they will not be shifted in the face of the engineer, the better to protect his rear; but in such case a secondary or "tell-tale" signal, as it is called, should be arranged to be shifted in the face of the engineer, such secondary signal to indicate the position of the primary signal in any of the ways known in the art.

I claim herein as my invention—

1. A signal-magnet and a battery at one end of an insulated electrically-connected block-section and connected with one line of rails thereof, a like magnet and battery at the other end of the block and connected with the other line of rails thereof, in combination with a circuit-shifting apparatus substantially as described, whereby on the approach of a train from either direction a circuit will be formed embracing the signaling-magnet of the near station, the battery of the remote station, and the intermediate electrically-connected track-rails.

2. A section of railway-track electrically insulated at its ends and having each line of rails electrically connected between the ends, in combination with a signal connected with one line of rails at or near one end, and movable circuit-changer connected to the other line of rails at or near the same end, and a movable circuit-changer and a battery connected the one to one end and the other to the other of said lines of rails at or near the other end of the section, substantially as set forth.

3. A system of electrically-operated railway block signaling apparatus consisting of an electric circuit and make-and-break mechanism at one end of a section, adapted to actuate a moving circuit-changer by an approaching or passing train, and a rail-circuit embracing a signal at the near and a battery at the remote station, such second circuit being brought into operation by the make-and-break mechanism at the end of the block, substantially as set forth.

4. An electrical block signaling apparatus having in combination electrical rail-circuits through the whole or the greater part of the length of the block-section, a signal-magnet at each end of the block-section electrically connected the one with one line of rails and the other with the other line of rails, a battery at each end of the section electrically connected with the same lines of rails and in the same order, an armature at each end of the section electrically connected to the same lines of rails, but in a reverse order, two contact points or studs to each armature, one connected with the signal-magnet and the other with the battery, and an electrical circuit and break-and-make mechanism at each end of the block-section, adapted to be actuated by a passing train, substantially as set forth.

5. A rail-circuit block-section, $R'$, electrically connected at each end by one wire with a battery, by another wire with a signaling-magnet, and by a third wire with an electrically actuated circuit-changer, in combination with a make-and-break mechanism at each end of the section, adapted to be actuated by the passing train, substantially as set forth, with reference to the formation of a closed circuit extending through the track-rails from one station to the next, and with reference to the short-circuiting of such section while the train is passing from one to the other stations.

In testimony whereof I have hereunto set my hand.

OSCAR GASSETT.

Witnesses:
R. H. WHITTLESEY,
GEORGE H. CHRISTY.